Feb. 24, 1959   J. L. V. BONNEY, JR   2,874,428
METHOD OF HARDENING OF SAND CORES AND THE LIKE
Filed March 1, 1956
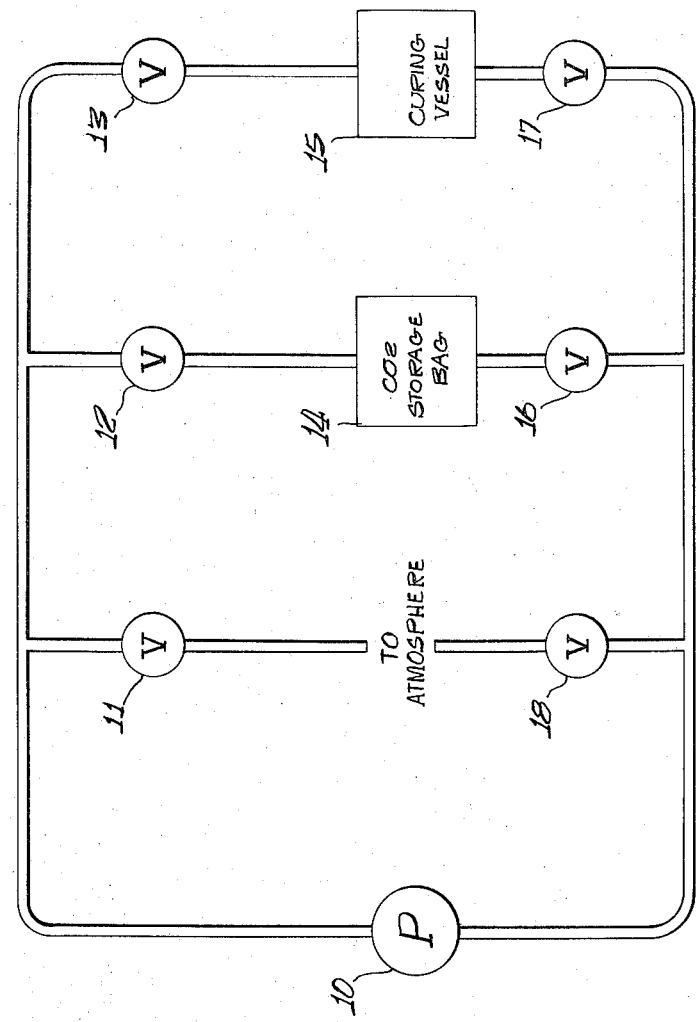
Inventor
John L. V. Bonney Jr
Carlson, Pitzner, Hubbard & Wolfe
Attorneys

United States Patent Office 2,874,428
Patented Feb. 24, 1959

2,874,428
METHOD OF HARDENING OF SAND CORES AND THE LIKE

John L. V. Bonney, Jr., Bexley, Ohio, assignor, by direct and mesne assignments, of one-half to The Bonney-Floyd Company, a corporation of Ohio, and one-half to Foundry Services Incorporated, a corporation of New York Application March 1, 1956, Serial No. 568,885

6 Claims. (Cl. 22—193)

This invention relates to the preparation of sand cores and the like useful in the casting of molten metal. More particularly the invention is concerned with an improved technique for preparing cores whereby the prolonged baking of such cores at elevated temperatures is eliminated. Specifically, the invention is directed to the preparation of sand cores and similar rammed sand objects useful in casting procedures wherein the sand is first wetted with a solution comprising essentially sodium silicate rammed into the desired shape and evacuated, after which the rammed, shaped sand having the silicate thereon is treated for a very short period of time with carbon dioxide or other acid-reacting material capable of setting the core by reaction with the sodium silicate.

It is, of course, well known in the art of metal casting that cores must be employed when molding certain objects having hollow areas in order to prevent the molten metal from filling an area where a void is desired. Cores used for this purpose have for years been prepared by mixing the same with a suitable core binder, such as linseed oil or other similar material, followed by baking the rammed core for a substantial period of time at an elevated temperature. More recently there has been introduced to the foundry industry both here and abroad the use of a solution comprising essentially sodium silicate for pre-treating the sand employed in manufacturing the core. The sand so treated may then be rammed into the desired shape and contacted with carbon dioxide. The results of such treatment have been striking and resulted in the manufacture of cores of substantial strength in very short periods of time, indeed, remarkably shorter than has ever been possible by the former technique of baking the cores.

British Patent 654,817 describes a method of manufacturing sand cores and the like wherein a water glass treatment followed by carbon dioxide contact is employed.

It has now been discovered that substantial improvements in the core strength as well as economies of operation and vastly reduced setting times will result if, prior to contacting a rammed sodium silicate treated sand core with carbon dioxide, substantially all of the air is evacuated from the interstices of the rammed core. By this technique, viz., water glass treatment of the sand, followed by evacuation of the rammed, shaped sand, and carbon dioxide treatment, it has been found that very small quantities of carbon dioxide may be employed and that the overall time required for producing high strength cores is vastly shortened compared to prior baking techniques and even substantially less than previous methods using water glass and $CO_2$.

It is, therefore, an object of the present invention to provide general improvements in the process of manufacturing sand cores wherein the sand is pretreated with water glass (sodium silicate) and an acid substance such as carbon dioxide is used to set the shaped core to a high strength article useful in casting.

A further object is to reduce the amount of time required when preparing sand cores using water glass and carbon dioxide treatment.

Still another object of the invention is to reduce the amount of $CO_2$ employed in such treatment and to enhance distribution thereof throughout the core.

In the accompanying drawing is shown a schematic representation of the valving and manifolding employed in a simple adaptation of the novel process herein described and claimed.

It should be borne in mind as the ensuing description of the invention proceeds that the treatment of sand used in cores and the like with sodium silicate and the application of $CO_2$ to the so treated sand (after ramming the same into a desired shape) is well known in the art. The instant invention is an improvement over such process in providing for the withdrawal of air from the core before introducing the $CO_2$. The unexpected advantages gained by such improved process are discussed elsewhere in this specification.

In general, the process of preparing hard sand cores by the present invention involves the steps of applying or mixing with a suitably fine sand such as, for example, a silica sand of 40 AFS or finer, a sodium silicate solution and milling the so treated sand in any suitable milling device, or even by hand. Following the application of the silictate to the sand, the wet sand is rammed into a desired shape, e. g., a cylinder, and the shaped core is placed in a gas-tight container equipped with lines through which the air may be evacuated and the carbon dioxide introduced. The design of the core box or the vessel in which the evacuation and carbon dioxide treatment takes place is not a part of this invention but it will be discussed in some detail later herein. After placing the rammed core in the core box, vacuum is drawn and the air is substantially evacuated from the interstices of the sand. The $CO_2$ is generally left in contact with the core in the vessel for a period of from a few seconds to about five minutes. In that time it has been found that the silicate is converted to a silica gel and the core is hardened to a compression strength suitable for use in casting of metal objects. It has been found that up to a point the longer the core is in contact with the carbon dioxide atmosphere, there is a gradual increase in the compression strength obtainable. However, after about a minute with cores of about a pound or less, the increase obtained is so small as to economically preclude additional residence time. Obviously the size of the core has a bearing on the amount of $CO_2$ used as well as the length of time the core is treated. Accordingly, for very large cores, e. g., 200 pounds or more and when using a pressure of about 5 to 10 pounds per square inch gauge, while about five minutes seems to be an adequate period for $CO_2$ introduction, some increase in strength will be noted for longer periods.

It is believed that the chemistry involved in the application of carbon dioxide to an alkaline sodium silicate treated sand leads to the formation of a silica gel and that the gel thus formed serves as a firm bond between sand particles. The suction is believed to proceed in accordance with the following chemical equation:

$$Na_2SiO_3(aq.) + CO_2 \rightarrow SiO_2(aq.) + Na_2CO_3$$

As in the case with conventional core oils, mixing the sand with the sodium silicate solution in a mill leads to what is believed to be a coating of each sand grain with a film of viscous binder. When the sand is then compacted (during the ramming step), liquid lenses of the binder are formed at the junction of the sand grains. Introduction of carbon dioxide then effects substantially instant reaction with the silicate resulting in the formation of the silica gel. Cores having compression strengths of between 200 and 300 pounds per square inch have thus been obtained after only a few seconds of $CO_2$ treatment.

Referring now to the diagrammatic representation of a system suitable for use in accordance with the instant invention, as shown in the attached drawing, pump 10 is a continuous-action pump drawing suction from one side and exerting pressure from the other. The discharge or pressure side of the pump is manifolded to three valves, 11, 12 and 13; 11 to atmosphere, 12 to the carbon dioxide storage bag 14, and 13 to the so-called curing vessel 15. On the suction side it is manifolded to atmosphere again, to the $CO_2$ storage bag 14 and to the curing vessel 15. In a typical operation with the pump running, valves 11 and 17 are open and all others are closed, and the curing vessel is thus evacuated with the air going out to atmosphere. Following evacuation, valves 11 and 17 are closed and valves 13 and 16 are opened and carbon dioxide is introduced from the $CO_2$ storage vessel into the curing vessel 15. After a sufficient period of time, ordinarily no more than about a minute, valves 13 and 16 are closed and valves 12 and 17 are opened to permit removal of the carbon dioxide from the curing vessel and return to the storage vessel. After the carbon dioxide has been returned to storage, valves 13 and 18 are opened and air is admitted to the curing vessel to relieve the vacuum and it is ready then for treatment of additional cores.

A pump may be employed in the instant process which is capable of reducing the pressure in the curing vessel to at least about 40 mm. of mercury and preferably at least about 1 mm. and which is capable at the same time of discharging gas against a head of about 15 pounds per square inch gauge. Naturally, two pumps may be used if desired, i. e., a vacuum pump and a pressure pump, but in practice it has been found entirely suitable to employ the single pump for this purpose.

The purpose of employing the carbon dioxide storage vessel is, of course, to recapture any unused $CO_2$. It does not have to be included in any process but has certain obvious economic advantages.

It is not entirely understood how the application of vacuum to the process of hardening silicate treated sand with carbon dioxide is responsible for the substantial improvements noted. It is believed, however, that by creating the vacuum and removing substantially all of the air, the carbon dioxide more readily permeates the sand and reaction with silicate can be obtained much more rapidly.

While it is desirable to employ a pump which can introduce the carbon dioxide under a reasonable pressure, it does not seem to be essential. Thus, experiments in which the carbon dioxide has been permitted to seep into the sand core from a balloon connected to the evacuated core box have resulted in cores of excellent compressive strength and, generally, in little if any difference from those prepared by pressurized carbon dioxide introduction.

From the standpoint of a commercial operation requiring production of a large quantity of cores, there seems to be little question but what a pressure introduction is required. And naturally, the extent of pressure will vary the length of time during which the carbon dioxide treatment takes place. Since the reaction apparently is a straightforward carbon dioxide and silicate reaction, it appears that the more rapidly the carbon dioxide is contacted with the treated sand throughout the entire mass, the sooner can the hardened core be prepared.

By varying the pressure under which the carbon dioxide is introduced from atmospheric to about 15 pounds per square inch gauge, it has been possible to reduce measurably the amount of time required for carbon dioxide treatment. The carbon dioxide consumed, however, appears not to vary to any substantial extent, irrespective of introduction pressure.

Since the instant process is applicable to the manufacture of cores of varying sizes, i. e., from less than a pound to as much as 200 pounds and even more, it will be apparent that the time element necessarily must vary relative to the size of the sand core. When employing any reasonable amount of pressure it has been found that for all practical purposes carbon dioxide introduction is complete within five minutes for the largest cores so far manufactured and a matter of a few seconds for those very small in size.

Just as the time required for introducing the carbon dioxide will vary with the size of the core, so, too, must the amounts of carbon dioxide and sodium silicate employed vary in like manner. In general, the amount of sodium silicate is employed equal to about 2% to about 10% by weight of the sand and while the carbon dioxide required to react with such an amount is determinable from stoichiometric relationships, it has been found that an amount from about 0.2% to about 5% by weight, depending again upon the amount of silicate employed, can be used. Ordinarily it has been found that complete reaction of all the silicate with carbon dioxide is not required in order to produce satisfactory cores by the hereindescribed technique.

Sodium silicate is reactive with carbon dioxide over a wide range of conditions and dilutions. And it is not intended to claim as invention here the proportions or conditions applicable to such process. It has been found, however, that application of the sodium silicate in a water solution containing in the range of from about 60 to 80% by weight of sodium silicate is very effective. And it has been found that somewhat of an excess of $Na_2O$ to $SiO_2$ in such a solution is also desirable. The presence of a material such as sugar or dextrine, or a combination of the two, appears to result in an overall better product. Apparently the sugar and/or dextrine have the dual effect of increasing the strength of the hardened article upon setting as well as assuring the later breakdown of the core after the molten metal has been poured and has itself cooled. Since the core must be removed at that time it is essential that it be sufficiently friable after the contact with the high heat of the molten metal that it can be readily removed from within the casting. An amount of sugar and/or dextrine equal to about the amount of water (on a weight basis) in the silicate solution appears to be most effective. For best results, particularly with respect to core strength, the sand should be as dry as possible when the sodium silicate solution is mixed therewith. Thus, when employing a solution containing about 15% water it has been found that amounts of moisture as little as 0.25% to 0.50% have caused substantial reduction in the compression strength of the cores produced. Since the aqueous solution is added in small amounts, e. g., about 4%, it will be apparent that even small quantities of water in the sand itself cause a substantial increase in overall water content.

Indicative of the improvement obtainable by the process of the present invention as compared to the former method of simply contacting the rammed silicate-treated sand with $CO_2$ are the data set forth in the following table. These data compare the compression strengths of 11 pound cores rammed from Congleton sand which had been mixed with 4% by weight of an aqueous 75% sodium silicate solution containing about equal amounts of sugar and water.

Table

| Pressure (mm. of Hg) | CO₂ Pressure (p. s. i.) | Time in Contact With CO₂ (sec.) | Average Strength (p. s. i.) |
|---|---|---|---|
| 40 | 10 | 15 | 220 |
| 40 | 10 | 30 | 245 |
| 30 | 10 | 15 | 213 |
| 30 | 10 | 30 | 215 |
| 20 | 10 | 15 | 209 |
| 20 | 10 | 30 | 252 |
| 760 | 10 | 15 | 80 |
| 760 | 10 | 30 | 142 |

From the foregoing it can readily be seen that well over 200% increase in strength results from the process of the present invention when comparing 15 seconds of $CO_2$ treatment with and without previous evacuation of air. The improvement in 30 seconds is also substantial. If a substantially longer period of time were employed the strengths would begin to approach one another.

The core box or curing vessel which may be employed herein can take any suitable form. Thus, any substantially gas-tight vessel or container in which a vacuum of at least about 40 mm. of mercury can be drawn and which is otherwise adapted to introduction of the acidic material such as carbon dioxide, may be used. It is, of course, essential that the core or other article being treated be held firmly in shape during the air removal and acid introduction.

Whereas the invention has been described with particular attention to $CO_2$ contact of sodium silicate treated sand it should be understood that other acid-reacting substances such as hydrogen chloride may also be employed. Very recently I have discovered that the so-called cold setting binders comprising essentially processed linseed oil or other similar drying type oil to which oxidizing agents such as naphthenates, permanganates, borates, etc., have been added, may be very much more quickly hardened by contact with ozone than with oxygen. Thus, whereas such oils ordinarily require several hours to harden cores or molds, ozone treatment thereof is almost immediate. The vacuum withdrawal of air from cores or molds treated with these cold setting binders ("freezing oils"), prior to contact with ozone, has reduced the time required to a still greater extent. Similar advantage may be realized when the sand has been treated with an acid setting resin and acid treatment of the coated sand is contemplated. Evacuation in such instance prior to introduction of the acid, e. g., HCl, will result in substantial improvements.

The process described herein is by no means limited to sand, e. g., silica or zircon, in the making of cores or molds and has definite application to the preparation of such objects from other granular materials of 40 AFS fineness and finer. Thus, Chamotte, calcined ganister, calcinal-aluminous clag grog, sand and cement mixtures, etc., may be formed into shaped articles in accordance herewith.

Having thus described my invention, what I claim as novel and desire to protect by Letters Patent is as follows:

I claim as my invention:

1. The method of forming shaped, compacted sand articles of substantial compression strength which comprises the steps of (1) mixing clean, substantially dry sand with an aqueous solution comprising essentially an inorganic silicate which affords $SiO_2$ in such solution, (2) shaping the so-treated sand into a desired form, (3) removing substantially the air entrapped in the interstices of the shaped sand form, and (4) contacting the substantially air-free sand form with carbon dioxide whereby a reaction is effected with said $SiO_2$.

2. The method of claim 1 wherein the silicate affording $SiO_2$ in solution is sodium silicate.

3. In the process of producing strong, shaped, compacted articles comprising predominantly sand-like granules wherein the sand-like granules are substantially coated with a material capable of reaction with a later added reagent to form a stronger bond between the sand-like granules than is obtainable in the absence of the said later added reagent, the improvement which comprises evacuating fluid present in the interstices of the shaped, compacted, sand-like article and then contacting the same with said later added reagent.

4. The improved process of claim 3 wherein the fluid evacuated from the interstices of the article is air and the same is removed under vacuum of at least 40 mm. of mercury.

5. The improved process of claim 3 wherein the shaped, compacted article comprises silica sand which had been mixed with at least about 2% by weight of sodium silicate solution prior to compaction and the later added reagent comprises carbon dioxide.

6. The improved process of claim 5 wherein the sodium silicate solution comprises about 60 to about 80% sodium silicate and about equal quantities of water and one or more constituents selected from the group consisting of sugar and dextrine.

References Cited in the file of this patent

UNITED STATES PATENTS

| 2,482,257 | Frei | Sept. 20, 1949 |
| 2,490,193 | Barr | Dec. 6, 1949 |

FOREIGN PATENTS

| 742,603 | Germany | Dec. 8, 1943 |

OTHER REFERENCES

Handbook of Chemistry & Physics, 26th ed., 1942.
Sprayed Metal Molds, Modern Plastics, vol. 30, Issue 1, pages 105–109, Sept., 1952.
Foundry Trade Journal, Feb. 2, 1956, pp. 99–105.
Foundry Trade Journal, March, 1956, pp. 104–109 and 128–135.